United States Patent [19]
Johnson et al.

[11] 3,913,967
[45] Oct. 21, 1975

[54] BALER SHIELD

[76] Inventors: Daniel H. Johnson, Rte. No. 1, Chariton, Iowa 50049; Harry T. Johnson, Box 83, Williamson, Iowa 50272

[22] Filed: Sept. 6, 1974

[21] Appl. No.: 504,277

[52] U.S. Cl. ............ 296/1 R; 56/17.4; 280/150 R; 296/90
[51] Int. Cl.² .................................... B60R 21/02
[58] Field of Search .......... 296/1 R, 28 C, 78 R, 85, 296/90; 280/150 R, 150 F, 152 R, 159; 56/17.4, 341; 100/88

[56] References Cited
UNITED STATES PATENTS

| | | | |
|---|---|---|---|
| 560,203 | 5/1896 | Fleming | 280/150 R |
| 2,667,379 | 1/1954 | Baze | 296/28 C X |
| 3,463,508 | 8/1969 | Killen | 280/152 R |
| 3,534,537 | 10/1970 | Buchele et al. | 56/341 |
| 3,704,030 | 11/1972 | McFerron | 280/150 R |
| 3,716,975 | 2/1973 | Smith | 56/17.4 |
| 3,722,197 | 3/1973 | Vermeer | 56/341 |

*Primary Examiner*—Robert J. Spar
*Assistant Examiner*—Leslie J. Paperner
*Attorney, Agent, or Firm*—Morton S. Adler

[57] ABSTRACT

A shield device is provided on the tongue structure of a hay baler particularly of the type designed to form the bales in rolls. The shield is mounted between the operative baler machinery and the operator of a tractor pulling the same to prevent the swirling hay and dust from reaching and enveloping the operator and is of transparent material so that the operator can view the baler for observation relative to the several working components that may need attention from time to time.

2 Claims, 5 Drawing Figures

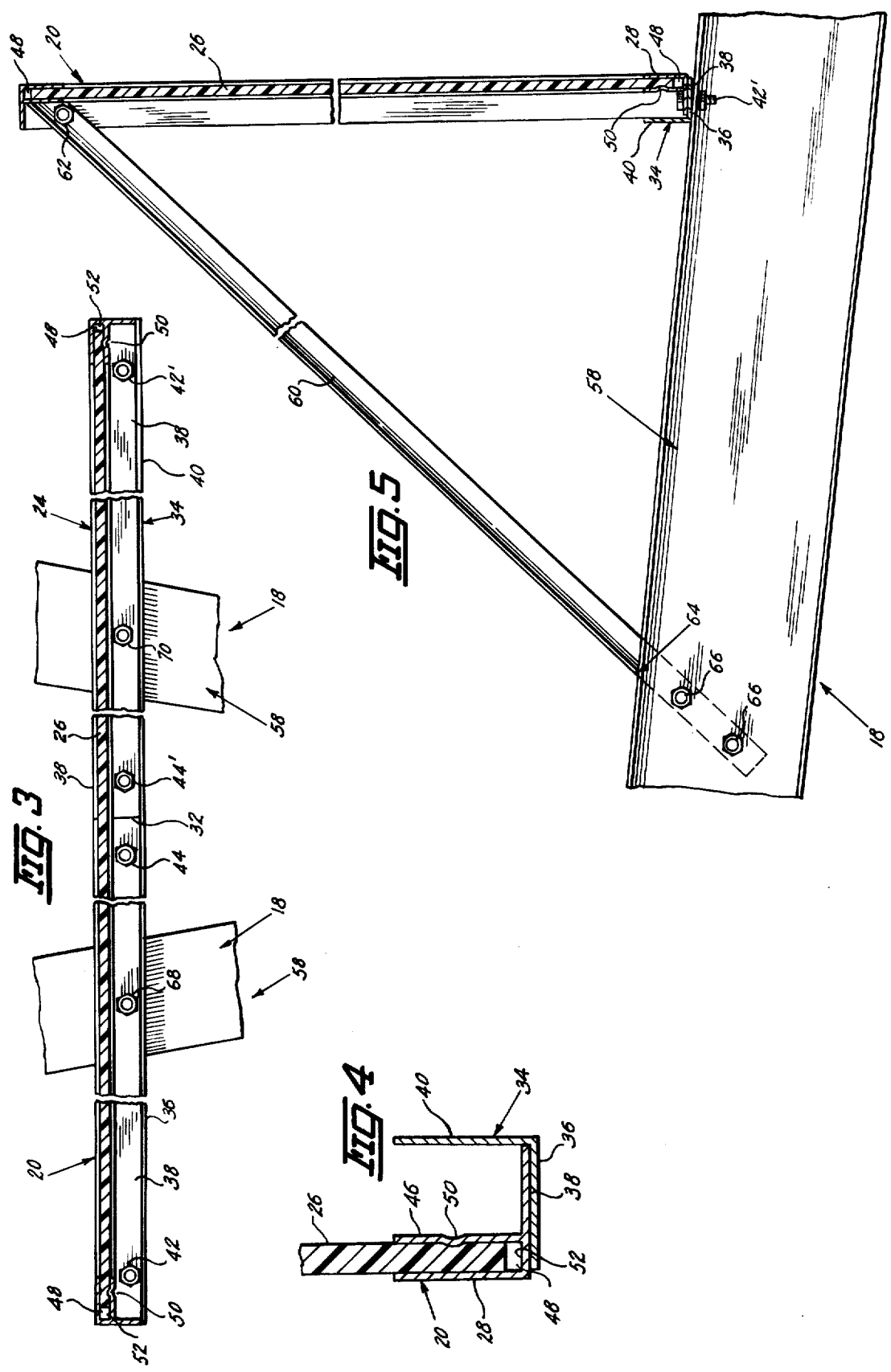

BALER SHIELD

BACKGROUND OF THE INVENTION

This invention relates to an improved shield device for a more expedient use of a hay baling machine and more particularly is designed for use with those types of hay baling machines of relatively recent vintage wherein the hay is suitably tied into relatively large rolls.

It has been observed in the operation of roll forming hay balers that in the gathering and tying of the hay, considerable swirling of the hay and dust is created that generally envelopes the operator of the tractor towing the baler not only to his physical discomfort and inconvenience but also to substantially obstruct his view and observation of the baler. Since such machines include the operation of certain binding string equipment, it is to the advantage of the operator that he be able to observe the proper functioning of the baler and to timely attend to any malfuncting such as string breakage or the like so as to minimize any delay and down time in the overall operation. This, of course, is difficult to accomplish when the operator must function in a swirl of hay and dust and, accordingly, it is one of the important objects of the present invention to provide a shielding device for mounting on a hay baler to effectively protect the operator of a tractor towing the same from contact with any swirling hay or dust created by the bale roll forming operation.

Another object herein is to provide a baler shield of the above class made of transparent material whereby the operator of a tractor pulling the baler is able to visually observe the working parts of the machine.

A further object is to provide an improved frame structure for supporting the transparent shield above characterized and to insure its stability and minimize the need for any maintainence.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 3 is a cross sectional view taken on the line 3—3 of FIG. 2, FIG. 4 is a cross sectional view taken on the line 4—4 of FIG. 2, FIG. 5 is a cross sectional view taken on the line 5—5 of FIG. 2.

DESCRIPTION OF THE PREFERRED EMBODIMENTS

Figure 1:
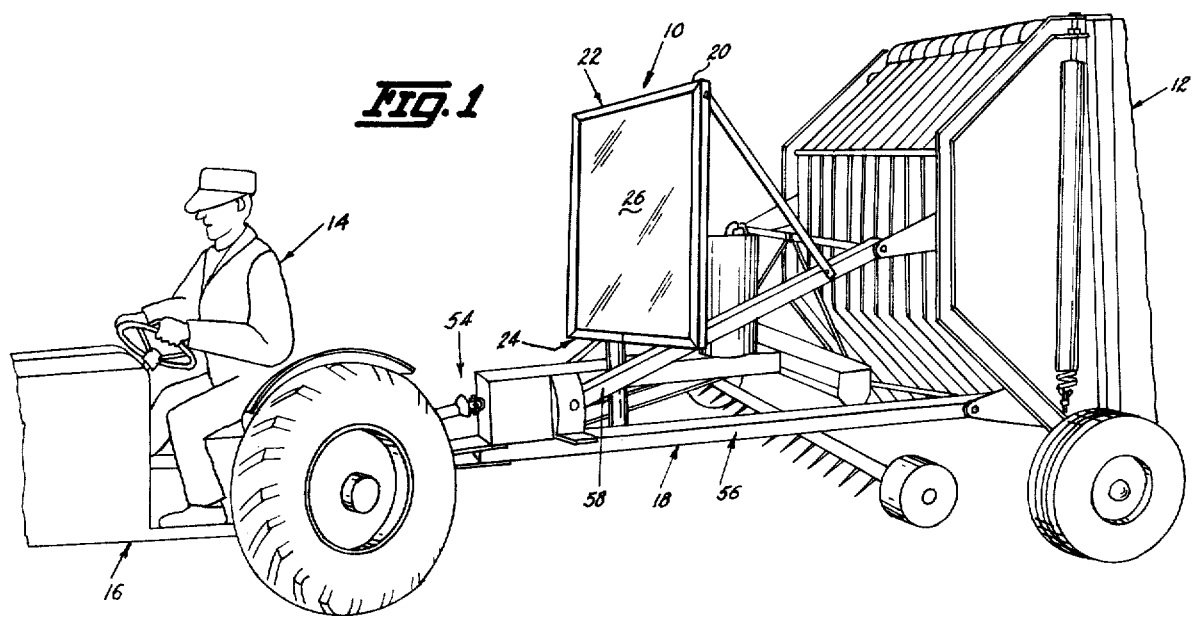
FIG. 1 is a perspective view of our new baler shield shown in relation to a fragmentary front portion of a roll forming hay baler and a fragmentary rear portion of a tractor hitched to the baler for towing the same and including an illustration of the relative position of the tractor operator.
Figure 2:
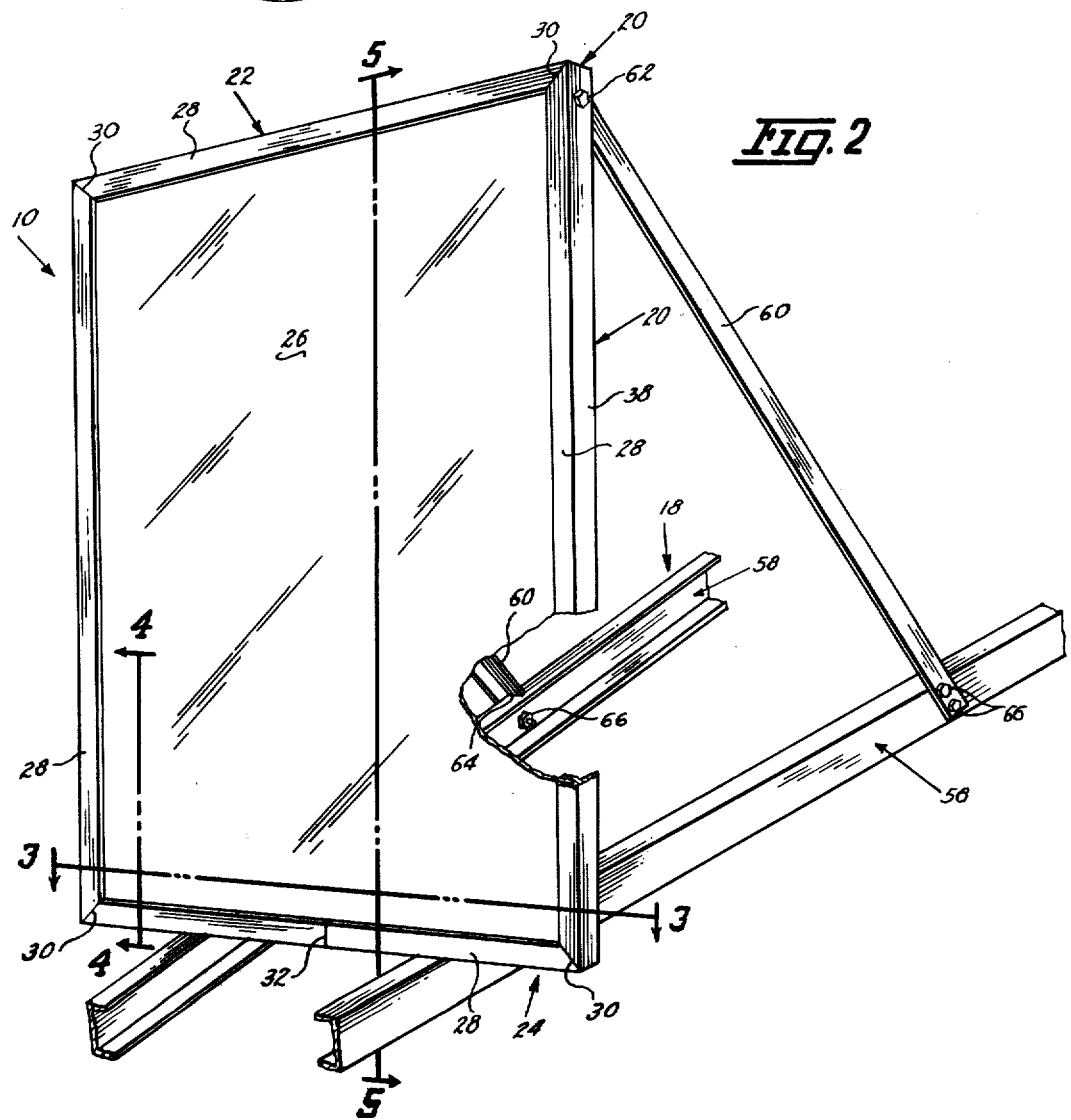
FIG. 2 is an enlarged perspective view of this baler shield shown mounted relative to the tongue structure of the hay baler.

Referring to the drawings, our new baler shield is designated generally by the numeral 10 as seen in FIG. 2 and is shown in FIG. 1 in its operable position in relation to a hay baling machine 12 and the operator 14 of a tractor 16 hitched to the tongue structure 18 of baler 12 in any suitable well known manner.

The machine 12, to which no invention is claimed per se, represents one of several available types of hay balers designed particularly to gather the hay and form it into relatively large tied rolls. Since the details of any such machine as depicted at 12 form no part of this invention, they are not shown but characteristic of the operation of such type of machines, it has been observed that there is produced a considerable swirling of hay and dust that tends to envelop the operator 14 not only to his physical discomfort and inconvenience but also to adversely interfere with his ability to observe the functioning of machine 12. Such observation is important in that prompt awareness by the operator 14 of any malfunctioning on the machine 12 as for example, a disruption of the string feed and tying mechanism as is well known, affords the operator 14 the opportunity of timely correcting the same so as to minimize the possibility of undue and unnecessary delays or non-operating time. Thus, notwithstanding the many advantages which the type of machine 12 may offer, the operator 14 finds himself working in a cloud of dust and it is the purpose of this invention to eliminate this condition by use of our new shield 10 which we shall now describe.

Shield 10 comprises generally a rectangular rigid frame 20 defining a top end 22 and a bottom end 24 and in which frame there is secured in a manner to appear, the transparent plate or deflector 26 preferably made from a suitable plastic material. While frame 20 may be made from any suitable material and in a variety of ways, we have designed such frame to particularly securely retain the plate 26 and at the same time to eliminate commonly used rigid fastening means for such purposes whereby any expansion of plate 26 that might occur when exposed to high ambient temperatures is accommodated without danger of buckling, breaking or cracking of the plate. For this purpose, we preferably make frame 20 from a single length of extruded angle aluminum material which is notched at predetermined spaced points along one side 28 of the angle material in a well known manner whereby the bending of such material at the notched points forms the mitered corners 30 (FIG. 2) of frame 20 and with the opposite ends of such material being abutted as at 32 in defining the frame bottom end 24.

Bottom end 24 is reinforced by a length of angle material 34 (FIG. 5) whereby side 36 of angle 34 is abutted against side 38 of frame 20 at the bottom end 24 and the other side 40 of angle 34 extends across the lower back side of bottom end 24 in parallel spaced relationship to side 28. Side 36 of angle 34 and side 38 of frame bottom 24 are secured together by the respective end bolt and nut members 42–42' and by a pair of like members 44–44' astraddle the abutment point 32.

In the mounting of plate 26 to frame 20 as seen in FIG. 2, reference is made to FIG. 4 showing the construction of the angle material forming frame 20. As previously described, the angle material of frame 20 normally includes the sides 28 and 38 and we have integrally formed a spaced parallel shoulder or or side 46 relative to one of the side members of frame 20, here shown as side 28, to provide a track 48 into which an edge of plate 26 can be frictionally slip-fitted and for which structure we have given the name of an F frame. Such frictional attachment is preferably enhanced by impressing a punched point at spaced intervals along the side 46 as indicated by the depression point 50 in FIG. 4 and it will be understood this arrangement is used throughout the four sides of frame 20. It will thus be seen by the use of the F frame aided by the friction points 50 that plate 26 may be securely mounted to frame 20 without the use of any through fastening means, and further in this regard, it is pointed out that the overall size of plate 26 is slightly less than the dimensions of frame 20 taken along the innermost surface of track 48 whereby there is provided an expansion area 52 in track 48 which can accommodate any expansion of plate 26 that might occur due to exposure to high ambient temperatures. Such expansion of plate 26, if it does occur, does not result in any breaking or buckling as is possible when a plate such as 26 is anchored by fasteners passed through drilled holes therein.

Shield 10 is mounted to the tongue structure 18 of the baler 12 at a point intermediate the operator 14 and the machine 12 as seen in FIG. 1 and while such tongue structure may vary in details with balers of different manufacture, it will generally have one or more pairs of arms or beams extending from the baler 12 in a converging relationship to a hitch point end 54 and for illustration, structure 18 includes the lower frame beams 56 and the upper beams 58 extending downwardly from machine 16 as shown.

For mounting shield 10, a pair of downwardly and outwardly extending angle braces 60 are respectively bolted as at 62 to the opposite corners of frame top 22 and at their lower ends, one side of the angle material is cut away to form a shoulder 64 (FIG. 5) to seat on one of the tongue frames 58 with the remaining lower portion extending donwardly against the outer side of frame member 58 where it is secured thereto by the nut and bolt means 66. The bottom end 24 rests across the forward converging portions of frame members 58 where it is secured thereto by the spaced nut and bolt means 68 and 70 as seen in FIG. 3. Thus arranged, shield 10 provides a generally upstanding barrier or shield between the operator 14 and the baler 12 with only a slight inclination towards the baler 12, if desired.

Field tests have established that shield 10, when mounted as described, has effectively eliminated the problem of the operator 14 being enveloped in flying dust and hay and the transparency of the plate 26 makes it possible for him to readily and easily observe the several working parts of the baler 12 as may be required. Accordingly, in view of the foregoing, it is thought a full understanding of the construction and operation of this invention will be had and the advantages of the same will be appreciated.

We claim:

1. The combination of a hay baling unit consisting of a mobile hay baling machine of a type forming cut hay into tied rolls, a tractor with an operator's station and hitched to said baling machine for towing the same and a shielding means operatively secured to said unit intermediate the baling machine and the operator's station to prevent such station from being enveloped by swirling hay and dust generated by the normal operation of the baling machine, said shielding means comprising:
   a closed frame of angle material defining a pair of sides at right angles to each other,
   a third side secured to said angle material in spaced relationship to one of the sides thereof to form a track whereby said angle material defines generally an F shape,
   a deflector plate contoured to the shape of said frame and secured thereto by a frictional slip-fit engagement of the plate edge portion into said track,
   said frame having a top end and a bottom end,
   said baling unit including a tongue structure intermediate said baling machine and said operator's station, and
   means securing said frame to said tongue structure in a generally upstanding position so that said bottom end is disposed tranversely of a direction of forward travel on said tongue structure and supported thereon.

2. The combination of claim 1 wherein said deflector plate is of transparent material to afford a means of visual observation from the operator's station of the baling machine during the operation thereof.

\* \* \* \* \*